Dec. 22, 1936.  A. D. MacLEAN  2,065,007
GAS METER
Filed Feb. 12, 1934  3 Sheets-Sheet 1

INVENTOR.
Allen D. MacLean.
BY
Strauch + Hoffman
ATTORNEYS

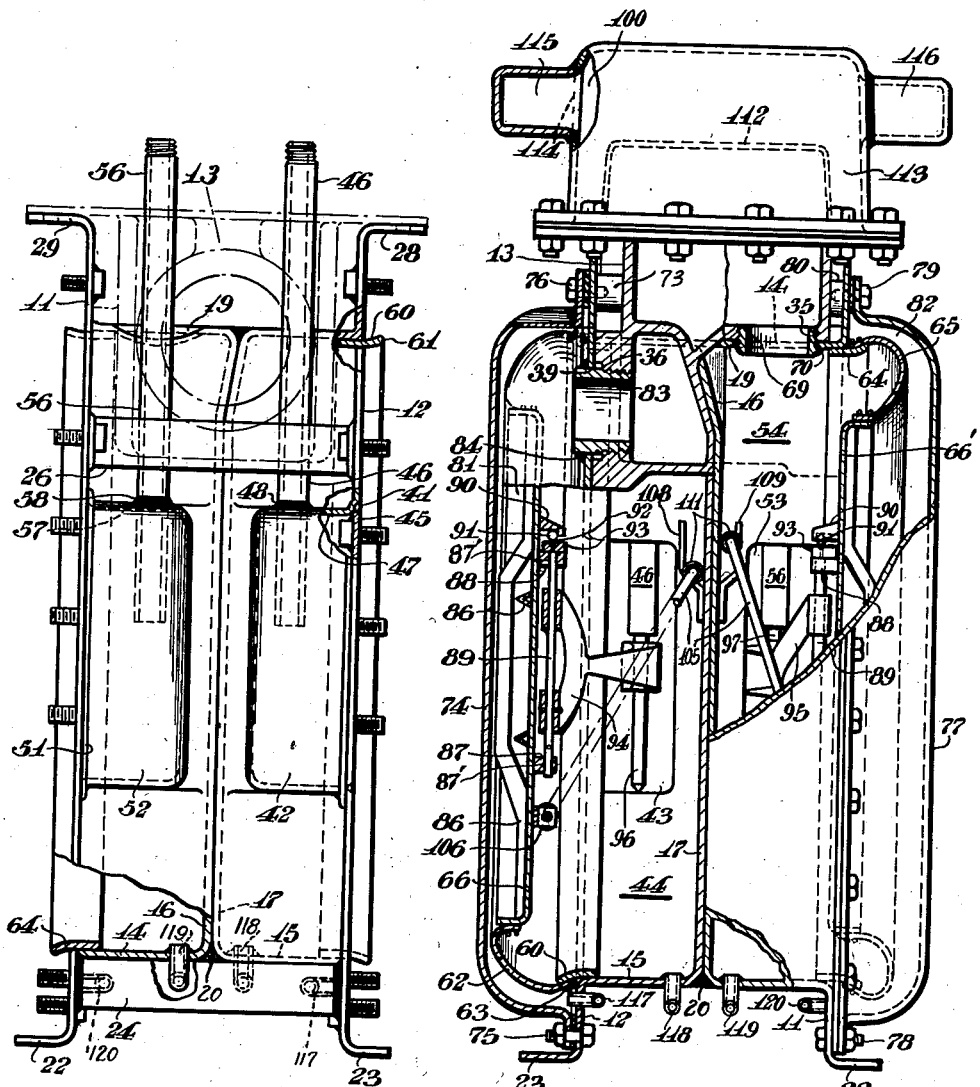

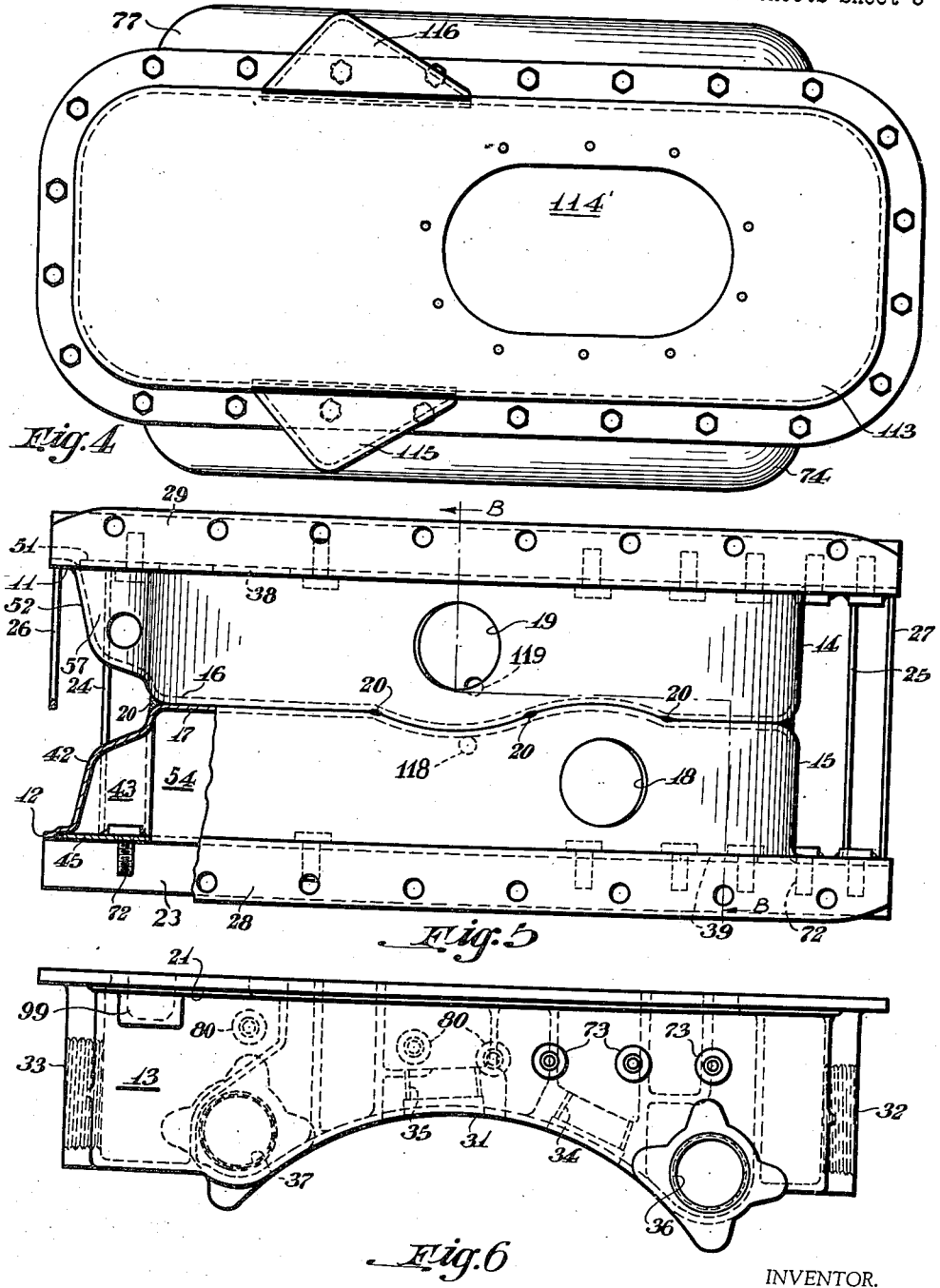

Patented Dec. 22, 1936

2,065,007

UNITED STATES PATENT OFFICE 2,065,007

GAS METER

Allen D. MacLean, Pittsburgh, Pa., assignor to Pittsburgh Equitable Meter Company, Pittsburgh, Pa., a corporation of Pennsylvania Application February 12, 1934, Serial No. 710,943

10 Claims. (Cl. 73—263)

The present invention relates to improvements in gas meters, and more particularly to improvements in sheet metal or sheet steel fabricated gas meter bodies.

In the application of Allen D. MacLean filed August 15, 1927, Serial No. 213,091, is described and claimed a gas meter composed of a cast metal ported body coupled by mechanical joints to sheet steel measuring chambers built up of welded plates. Such meters are especially adapted to the measurement of relatively large volumes of gases at high distribution pressures. The present invention is in part a continuation of said application and is also an improvement upon the construction disclosed therein whereby the amount of welding required is reduced and a welded connection is made between the cast metal ported body and the sheet steel measuring chambers.

Accordingly, it is an object of the present invention to provide a novel and improved construction of a gas meter utilizing pressed sheet metal or sheet steel measuring chambers secured to a cast metal ported body through a welded connection.

A further object is the provision of means for making a welded gas tight connection between the sheet steel measuring chambers and the cast iron ported structure of a meter.

Another object is the provision of a meter fabricated from sheet metal plates in which the amount of welding is reduced to a minimum.

A further object is the provision of a gas meter composed of two similar dish shaped members welded or otherwise secured together back to back, and having suitable supporting rings welded thereto for receiving the ends of the diaphragms.

These and further objects of the invention will be apparent from a consideration of the following detailed description of a preferred embodiment of the invention taken in connection with the accompanying drawings in which:

Figure 2 is an end view looking in the direction of the arrow II on Figure 1, the ported cast body being shown in dot and dash lines with certain parts of the measuring chambers broken away to show the welded joints; the diaphragms, flag arms and valve mechanism being removed.

Figure 3 is a composite section view, the one plate being shown in section on line A—A of Figure 1, the ported body being shown in section on line B—B of Figure 5, certain parts on the right side being broken away and shown in section on the vertical center line.

Figure 4 is a top plan view of the assembled meter on a slightly reduced scale, the register being removed.

Figure 5 is a top plan view on a slightly reduced scale of the sheet steel measuring chamber plates in assembled position without the diaphragm rings, and Figure 6 is a side elevation on a slightly reduced scale of the cast metal ported structure.

Figure 1:
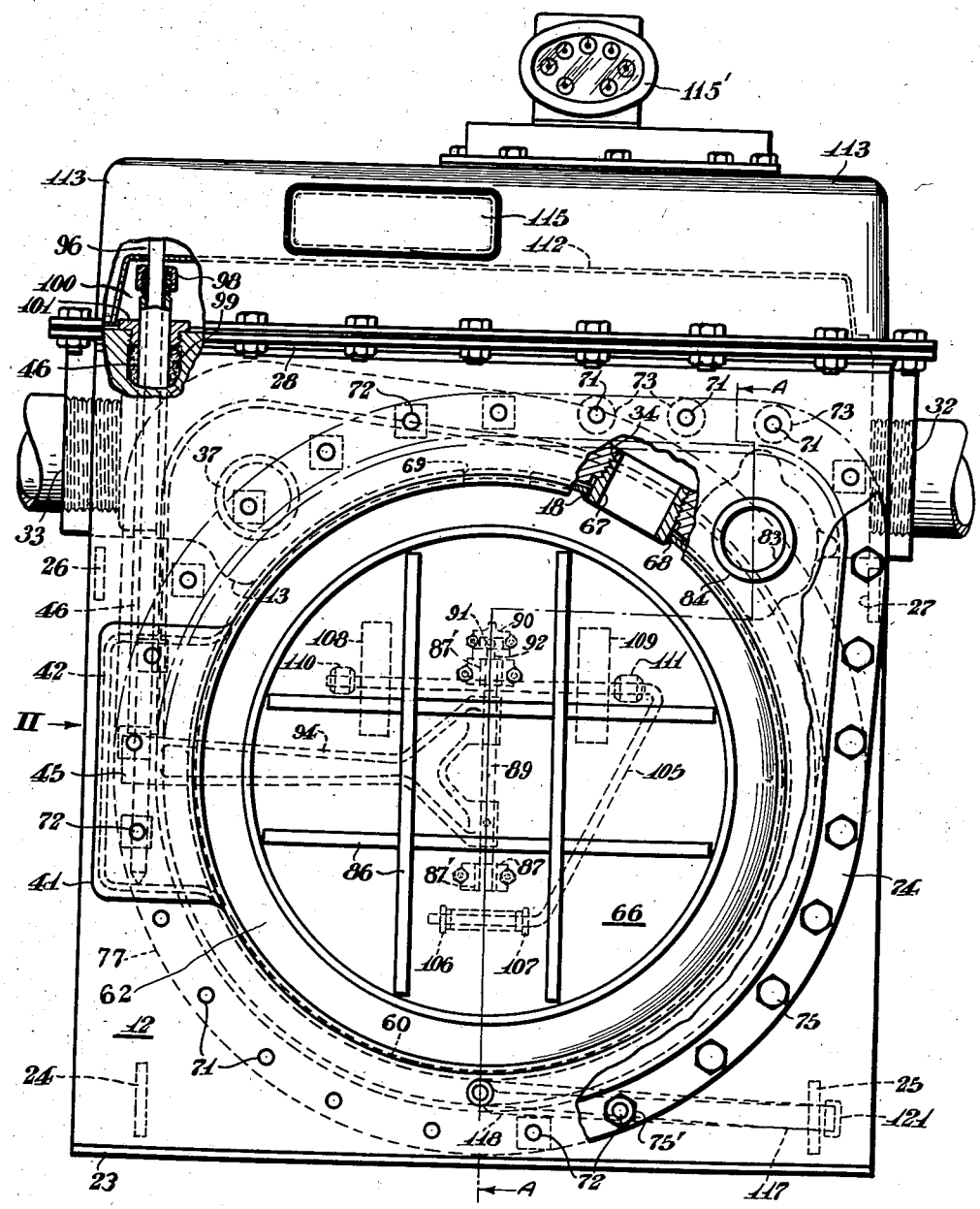
Figure 1 is a side view in elevation of a preferred embodiment of my invention with the side cover and parts of the measuring chamber broken away.

Referring to the drawings, in which like characters designate like parts, the meter is built up of a pair of dished pressed steel plates (Figures 2 and 5) indicated generally by the reference numerals 11 and 12, suitably secured to a cast iron ported structure (Figure 6) indicated generally by the numeral 13 having ports therein for admission to and discharge of gas from the measuring chambers. The plates 11 and 12 are alike in many details of construction and are formed by pressing to provide dished portions spaced from the edges having cylindrical walls 14 and 15 and substantially plane walls or bottoms 16 and 17 respectively. As shown in Figure 5, the walls 16 and 17 are offset near the top so as to provide additional width of the cylindrical walls for forming the holes 19 and 18 therethrough. The plates are adapted to be secured together with the plane walls 16 and 17 back to back by spot welding at various points around the periphery as indicated at 20, or they may be secured together in any other suitable manner, and said plates have their lower ends turned over as indicated at 22 and 23 to provide feet upon which the meter rests. The plates 11 and 12 are supported or braced in this position by the bracing bars 24, 25, 26 and 27 which are welded to the back faces of said plates.

In assembled relation the ported structure 13 (Figure 6) is adapted to be located between the plates 11 and 12, which form flanges substantially parallel to the backs or bottoms of the dished portions, and has a flange 21 resting on the turned over top edges 28 and 29 of said plates and is secured in place in a manner presently to be described, and has a curved bottom portion 31 which is adapted to fit over the curved cylindrical walls 14 and 15 of plates 11 and 12. The body 13 preferably is made of cast iron, and has intake and outlet ports in the top surface thereof adapted to be controlled by valves and which communicate with the inlet 32 and outlet 33 of the meter in such manner that the gas entering inlet 32 must pass through a measuring chamber to reach the outlet 33. The system of ports and passages in this structure is more particularly described in said copending applications hereinbefore referred to and therefore will not be described in detail. Suitable tapered threaded holes 34 and 35 communicating with the internal passages of the body 13 are provided in the curved bottom 31, and in assembled position these holes are in alignment with the holes 18 and 19 respectively in the cylindrical walls 15 and 14. Likewise the body 13 is provided with lateral tapered threaded holes 36 and 37 communicating with the internal passages of the body, and these holes are in alignment with the lateral holes 39 and 38 respectively in the upright portions of plates 12 and 11.

Referring to Figures 1, 2 and 3, a portion of the plate 12 is blanked out as indicated at 41, and the wall 15 is formed outwardly at this point to provide a wall 42 which forms a flag rod chamber or pocket 43 opening into the measuring chamber 44 formed by the walls 17 and 15. The opening formed at 41 in plate 12 in blanking out the flag rod chamber 43 is closed by a plate 45 (Figure 5) welded therein to form a gas tight joint whereby the flag rod chamber 43 is closed on all sides but the one connecting to the measuring chamber. A flag tube 46 passes through a suitable hole in the top wall 47 of the flag rod chamber and is welded in place as indicated at 48 to form a gas tight joint. The plate 11 has a similar open portion closed by a welded plate 51 (Figures 2 and 5) which with the similar outwardly formed wall 52 forms a similar flag rod chamber or pocket 53 opening into the similar measuring chamber 54 (Figure 3). A flag tube 56 passes through a suitable hole in the top wall 57 of the flag rod chamber 53 and is similarly welded in place as indicated at 58.

A diaphragm ring 60 having its outer end flared and rounded as indicated at 61 is located within the cylindrical wall 15 and is welded in place by a gas tight weld, and a diaphragm 62 is adapted to be secured to the outer edge thereof by cord 63 or similar binding. A similar outwardly flared ring 64 is similarly welded to the cylindrical wall 14 and has a diaphragm 65 secured thereto in a similar manner. The diaphragm 62 is secured in gas tight relation to a diaphragm pan 66, and diaphragm 65 is similarly secured to a pan 66'. It will be seen therefore that the cylindrical wall 15, plane wall 17, diaphragm 62 and pan 66 form a measuring chamber 44, and the measuring chamber 54 is similarly formed by the walls 16, 14, diaphragm 65 and pan 66'. Measuring chamber 44 is connected with the proper ports in the ported cast body 13 by a threaded sleeve 67 threaded into the threaded hole 34 therein and passing through the hole 18 in wall 15. The sleeve is then secured in place by welding it to wall 15 as indicated at 68. The measuring chamber 54 communicates with its port in the ported structure through a threaded sleeve 69 threaded into the hole 35 in the ported structure and passing through hole 19 in wall 14, and is suitably welded to the cylindrical wall 14 as indicated at 70.

With regard to the insertion of sleeves 67 and 69 in the assembly, while it has been found that a gas tight connection can readily be secured through the tapered threading, this connection tends to loosen due to the expansion caused by the heat when the sleeves are welded at 68 and 70 respectively. To prevent such loosening and to maintain the threaded connection in gas tight connection, it is preferred to surround the threaded connections with water or any suitable cooling medium to absorb and conduct away the heat communicated to the threaded connection by the welding operation. While very simple, this method of welding has produced excellent results.

As seen in Figure 1, the plate 12 has a circular series of holes 71 therein and through certain of said holes are passed the square headed bolts 72, the heads being welded to the inner face of the plate. The three bolts that pass into the flag chamber 43 are welded gas tight. The bolts 72 are welded to the plate for the reason that they are not readily accessible for holding by a wrench and would turn when a nut is screwed thereon if not held. Aligned with certain of the holes 71 the body 13 has a number of lugs 73 projecting from the side thereof, these lugs being tapped and bored. A diaphragm cover 74 having a flange with suitable holes therein is adapted to cover the diaphragm 62 and is bolted to plate 12 by suitable bolts 75 and nuts 75' threaded onto welded bolts 72, a suitable gasket forming a gas tight joint. Cap screws 76 pass through the cover flange and plate 12 and are threaded into the lugs 73. The diaphragm cover 77 is similarly secured to plate 11 by bolts 78 and cap screws 79 that pass through holes in the flange of cover 77 and in plate 11 and are threaded into lugs 80 on the body 13 on the opposite side.

The diaphragms 62 and 65 form with the side covers 74 and 77 respectively a pair of measuring chambers 81 and 82. The chamber 81 communicates with the proper passages in body 13 through a threaded nipple 83 which passes through hole 39 in plate 12 and is threaded into the hole 36 in the body 13. The nipple 83 is welded about its outer periphery to the plate 12 as indicated at 84 to form a gas tight joint. The chamber 82 communicates with the passages in body 13 through a similar threaded nipple similarly threaded in hole 37 and passing through hole 38, and is secured by welding to plate 11. Thus it will be seen that four measuring chambers 44, 54, 81 and 82 are provided in proper communication with the passages in the cast iron body 13.

As is well understood, the passage of gas through the meter causes the diaphragm pans to reciprocate as the measuring chambers are filled and emptied of gas, and the movement thereof is communicated by suitable mechanism to the valves and register of the meter. As both diaphragm pans 66 and 66' are alike in construction and in operation only one will be described in detail.

The pans 66 and 66' have angular reenforcing ribs 86 thereon, and each carries two brackets or bearings 87 and 88 secured thereto by U-bolts or similar means and in which are rotatably secured rods 89. Extension brackets 90 on each pan are hollowed out to receive balls 91, and the rods 89 have reduced ends 92 upon which fit bored discs 93 which are welded to the rods and retain the balls 91 in their sockets. Flag arms 94 and 95 are suitably secured to rods 89 at one end, and their other ends are secured to flag rods 96 and 97 which pass completely through the flag tubes 46 and 56 into the valve chamber 100. A suitable packing nut 98 threaded on each flag tube prevents leakage between the flag rods and tubes and a stuffing box 99 formed in the body 13 around each tube and having a gland or follower 101 threaded therein prevents leakage around the flag tubes. The reciprocating movements of the pans 66 and 66' through their flag arms 94 and 95 cause oscillation of the flag rods 96 and 97 to operate the valves and admit and discharge gas from the measuring chambers in their proper sequence in a manner well known in the art.

Because of the restraining influence of diaphragm 62 the diaphragm pan 66 will tend to assume a motion of rectilinear reciprocation on a hypothetical axis through its center, the plane of the diaphragm pan being normal to said axis. However, flag arm 94 is fixed to rod 96 and moves in an arcuate path with rod 96 as its axis, and as shaft 89 is journalled in the flag arm 94 this shaft likewise moves in an arc. The bearings 87 and 88 have slots 87' therein just wide enough to receive shaft 89 without binding and said slots are elongated in a lateral plane as shown in Figure 1. This permits movement of the shaft 89 laterally relative to the pan 66, and the weight of the pan is supported on the ball 91, which also permits sidewise motion so that the pan is free to move in its normal unrestrained path. The pans are guided to prevent canting thereof during operation by U-shaped rods 105 pivoted in aligned bearings 106 and 107 on the pan 66, and vertically slidable in the brackets 108 and 109 welded to the plane wall 17. Suitable rollers 110 and 111 freely rotatable on the longer horizontal arm of rod 105 reduce friction as the arm reciprocates in the brackets.

A pressed sheet steel cover 112 formed of one piece is provided for the valves, and the top cover 113 similarly is of one piece of sheet steel properly formed and having cut out portions 114 on either side thereof. Formed sheet steel pocket members 115 and 116 are welded thereto to provide space for movment of the valve arms (not shown), and the cover 113 has a suitable opening 114' therein normally covered by the register assembly 115' bolted thereon and driven by the meter in well known manner. At the bottom the drainage tubes 117, 118, 119 and 120 communicate with the measuring chambers 81, 44, 54 and 82 respectively to permit removal of tar, naphthalene or other liquid or solid sediment therefrom. These drainage tubes normally are closed by suitable caps 121.

In operation, gas enters the meter at intake 32, and through suitable ports in the body 13, enters the chamber formed by the valve cover 112. The operation of the valves therein permits passage of the gas in proper sequence into the measuring chambers 81, 44, 54 and 82, and discharge of the measured gas through the outlet 33, all as is well understood in the art. The welds formed at 48 and 58 and at the plates 51 and 45, and the connections at 18 and 19 are the only extensive welded joints which are required to withstand the full pressure of the gas. The steel pipes 117, 118, 119 and 120 are small and present no special difficulty or problem in producing a gas tight joint. The welded joints made for the diaphragm rings need only withstand the differential pressures of the gas in the measuring chambers. Hence, it will be seen that not only is the total amount of welding reduced over the construction shown in my copending application, but the greatest amount of the welding is subject to only a small pressure differential and is therefore not liable to leak.

It will accordingly be seen that an efficient gas meter construction of comparatively low cost is provided which is adapted for the measurement of large volumes of gases, and that various combinations and sub-combinations of elements are provided useful in other types of meters and in other relations than those for which they are herein described.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gas meter, a frame comprising a plurality of pressed sheet steel dished plates secured bottom to bottom with flanges extending therefrom substantially parallel to the bottoms, a plurality of covers closing the mouths thereof and secured to said flanges respectively, diaphragm rings secured adjacent the juncture of the dished walls and flanges and forming substantially a continuation of the dished walls, a plurality of diaphragms secured to said rings and forming metering compartments, a cast ported body between said flanges, and conduits connecting the ports in said body and said metering chambers.

2. In a gas meter, a frame comprising a plurality of pressed sheet metal plates having dished portions secured back to back and having flanges extending therefrom substantially parallel to the backs, a ported body between said flanges, a diaphragm supporting ring welded to each plate, a cover for closing the openings of each of said plates and spaced from said dished portions, a diaphragm secured over each opening to each of said rings to provide measuring chambers, and conduits between said measuring chambers and ported body.

3. In a gas meter, a frame comprising a plurality of pressed sheet metal plates having dished portions secured back to back, a ported cast metal body member between said plates, a diaphragm supporting ring welded to each plate, a dished cover for closing the openings of each of said plates, a diaphragm secured over each ring to provide measuring chambers, and nipples passing through said measuring chamber walls threaded into said ported body and welded to said chamber walls.

4. In a gas meter, two dished members of pressed steel welded together to form a frame, said members being provided with indented portions to receive flag rod guides, sheet steel plates welded over the indentations, a diaphragm secured over the dished portions, external covers over the diaphragms, said assembly of diaphragms, external covers, and indented members forming four measuring compartments.

5. In a gas meter, a diaphragm, a diaphragm pan secured to said diaphragm, a flag rod journalled in said pan, a bearing disc mounted on one end of said rod, a ball bearing socket secured to said pan adjacent said disc, and a ball bearing in said socket arranged to engage said disc.

6. In a gas meter, a diaphragm, a diaphragm pan secured to said diaphragm, a flag rod journalled in said pan in a manner to permit relative lateral movement between said pan and said rod, a bearing disc mounted on one end of said rod, a ball bearing to engage said disc and a ball bearing socket secured to said pan and arranged to permit lateral movement of said ball bearing in accordance with the lateral movement between said pan and said rod.

7. In a gas meter, two metal body plates each having an integral dished central portion spaced from the edges thereof to provide a flange substantially parallel to the bottom, said plates being secured with the bottoms of the dished portions back to back, a diaphragm ring secured in gas tight relation to each plate adjacent the juncture of the flange and dished portion, two metal dished cover plates, means to secure said cover plates to the body flanges in gas tight relation, a ported structure located between the flanges of the body plates, and means to secure said ported structure to said flanges.

8. In a gas meter, two metal body plates each having an integral dished central portion spaced from the edges thereof to provide flanges, said plates being secured with the bottoms of the dished portions back to back, the dished portions being formed to provide flag rod chambers leaving open portions in the flanges of the plates, two metal plates secured in said open portions substantially flush with the flanges for closing one side of said flag rod chambers, and flag rod tubes projected into said flag rod chambers and secured to said body plates.

9. In a gas meter, two metal body plates each having an integral dished central portion spaced from the edges thereof to provide flanges, said plates being secured with the bottoms of the dished portions back to back, the dished portions being formed to provide flag rod chambers leaving open portions in the flanges of the plates, two metal plates secured in said open portions substantially flush with the flanges for closing one side of said flag rod chambers, a ported structure located between the flanges of the body plates, flag rod tubes projecting into said flag rod chambers and through said ported structure and secured to said body plates, means to secure said ported structure to said body plates, and dished cover plates secured to the flanges of the body plates.

10. In a gas meter, two metal body plates each having an integral dished central portion spaced from the edges thereof to provide flanges, said plates being secured with the bottoms of the dished portions back to back, the dished portions being formed to provide flag rod chambers leaving open portions in the flanges of the plates, two metal plates secured in said open portions substantially flush with the flanges for closing one side of said flag rod chambers, a diaphragm ring secured to each plate adjacent the juncture of the flange and dished portion, a diaphragm secured on each of said diaphragm rings, a ported structure located between the flanges of the body plates, flag rod tubes projecting into said flag rod chambers and through said ported structure and secured to said body plates, means to secure said ported structure to said body plates, and dished cover plates secured to the flanges of said body plates.

ALLEN D. MacLEAN.